United States Patent
Bjorstrom et al.

(10) Patent No.: US 8,881,374 B1
(45) Date of Patent: Nov. 11, 2014

(54) METHOD OF MANUFACTURING FOR A DISK DRIVE HEAD SUSPENSION FOR A FOLD OVER LIMITER

(75) Inventors: Jacob D. Bjorstrom, Hutchinson, MN (US); Reid C. Danielson, Cokato, MN (US); Eric O. Naatz, Litchfield, MN (US); John A. Rickeman, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 1758 days.

(21) Appl. No.: 11/776,339

(22) Filed: Jul. 11, 2007

(51) Int. Cl.
*G11B 5/48* (2006.01)

(52) U.S. Cl.
USPC .................. 29/603.03; 29/603.04; 360/245.4; 360/245.7

(58) Field of Classification Search
USPC ............ 29/603.03, 603.04, 432, 437, DIG. 3, 29/521; 360/245, 245.5, 245.7, 245.4; 72/379.2
See application file for complete search history.

(56) References Cited

U.S. PATENT DOCUMENTS

| 5,333,085 A | 7/1994 | Prentice et al. |
| 5,892,637 A | 4/1999 | Brooks, Jr. et al. |
| 6,172,853 B1 | 1/2001 | Davis et al. |
| 6,445,546 B1* | 9/2002 | Coon .......................... 360/245.7 |
| 2001/0012181 A1* | 8/2001 | Inoue et al. ............... 360/245 X |

FOREIGN PATENT DOCUMENTS

JP 2005209336 A * 8/2005

* cited by examiner

*Primary Examiner* — A. Dexter Tugbang
(74) *Attorney, Agent, or Firm* — Faegre Baker Daniels LLP (57) ABSTRACT

A method for manufacturing a disk drive head suspension including a load beam, a flexure and a limiter for restricting the range of motion of the flexure with respect to the load beam. The load beam includes an aperture and an engaged portion adjacent to the aperture. The flexure, in an unformed state, includes a slider mounting region and a generally planar engagement structure extending from the slider mounting region. The engagement structure includes a tab portion extending from the slider mounting region and a hook portion extending from the tab portion. During a first forming operation the hook portion is bent around a tooling die to a ninety degree angle with respect to the tab portion. The flexure is then welded to the load beam with the hook portion extending into the aperture. During a second forming operation the tab portion is bent around a tooling die to a ninety degree angle with respect to the slider mounting region. The second forming operation causes the hook to extend over the engaged portion of the load beam. The first and second forming operations can be performed with tooling moving only in a z-direction.

8 Claims, 8 Drawing Sheets

METHOD OF MANUFACTURING FOR A DISK DRIVE HEAD SUSPENSION FOR A FOLD OVER LIMITER

FIELD OF THE INVENTION

The invention is a limiter for a disk drive head suspension, and a method for manufacturing the limiter.

BACKGROUND OF THE INVENTION

Limiters for constraining the range of motion of one portion or component of a disk drive head suspension with respect to another portion or component are well know. For example, limiters are often used to limit the motion of the slider mounting region of a flexure with respect to a load beam to which the flexure is attached. Limiters of these types and methods for manufacturing the limiters are disclosed, for example, in the Brooks, Jr. et al. U.S. Pat. No. 5,892,637.

Disk drive head suspension limiters can generally be classified into one of two categories. The first category is limiters that are formed after the two components have been assembled (e.g., welded) to one another. The limiter shown in the Davis et al. U.S. Pat. No. 6,172,853 is an example of a limiter of this first category. Limiters formed after component assembly are often easy to manufacture, and have relatively tight tolerance limiter gaps (the amount of space between the engaging and engaged portions of the structure). Unfortunately, the limiters often have relatively low limiter engagement (the amount of overlap between the engaging and engaged portions). Limiters with low engagement are prone to unhooking.

The second category is limiters that are formed before the two components are assembled. The limiter shown in the Prentice et al. U.S. Pat. No. 5,333,085 is an example of a limiter of this second category. The assembly of these limiters requires the merger of the engaging and engaged portions or components. The merge process often involves motion along more than one axis, something that can complicate the suspension manufacturing process. Although merged limiters often have higher limiter engagement making them less susceptible to unhooking, the merge process often makes it more difficult to control the limiter gap.

There remains a continuing need for improved limiter structures and methods of manufacture and assembly. A limiter that can be formed after assembly, and provide both high engagement and tight limiter gap specifications would be particularly desirable.

SUMMARY OF THE INVENTION

The invention is a limiter having both high limiter engagement and tight limiter gap specifications that can be formed and assembled without merge operations requiring motion in more than one direction. A suspension having a limiter in accordance with one embodiment of the invention includes a first suspension component having an engaged structure and a second component attached to the first component and having an engaging structure. The engaged structure of the first component comprises an open region and an engaged portion adjacent to the open region. The engaging structure of the second component comprises a motion-limited region, a tab and a hook. The tab has a width extending from the motion-limited region into the open region of the first suspension component. The hook has a width that is less than the width of the tab and extends from the tab over the engaged portion of the first suspension component.

DETAILED DESCRIPTION OF THE PREFERRED EMBODIMENTS

Figure 1:
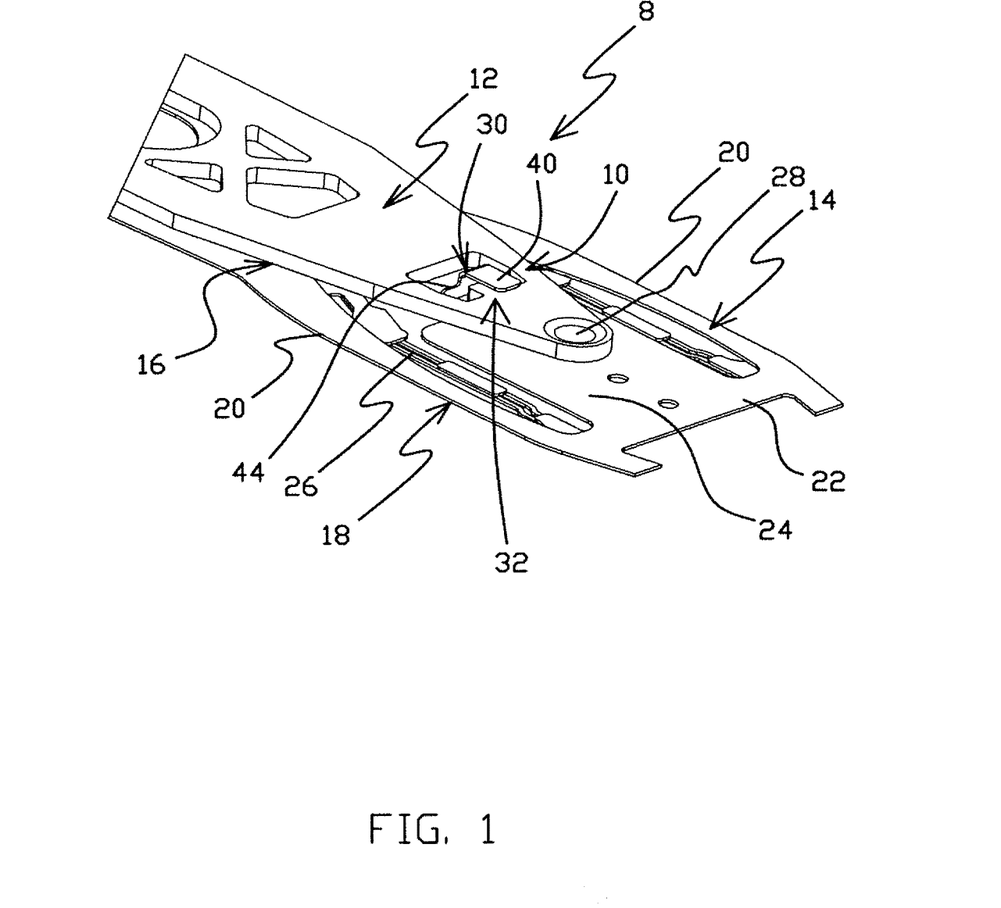
FIG. 1 is an isometric illustration of the distal end of a suspension assembly including a fold over limiter in accordance with one embodiment of the invention.
Figure 2:
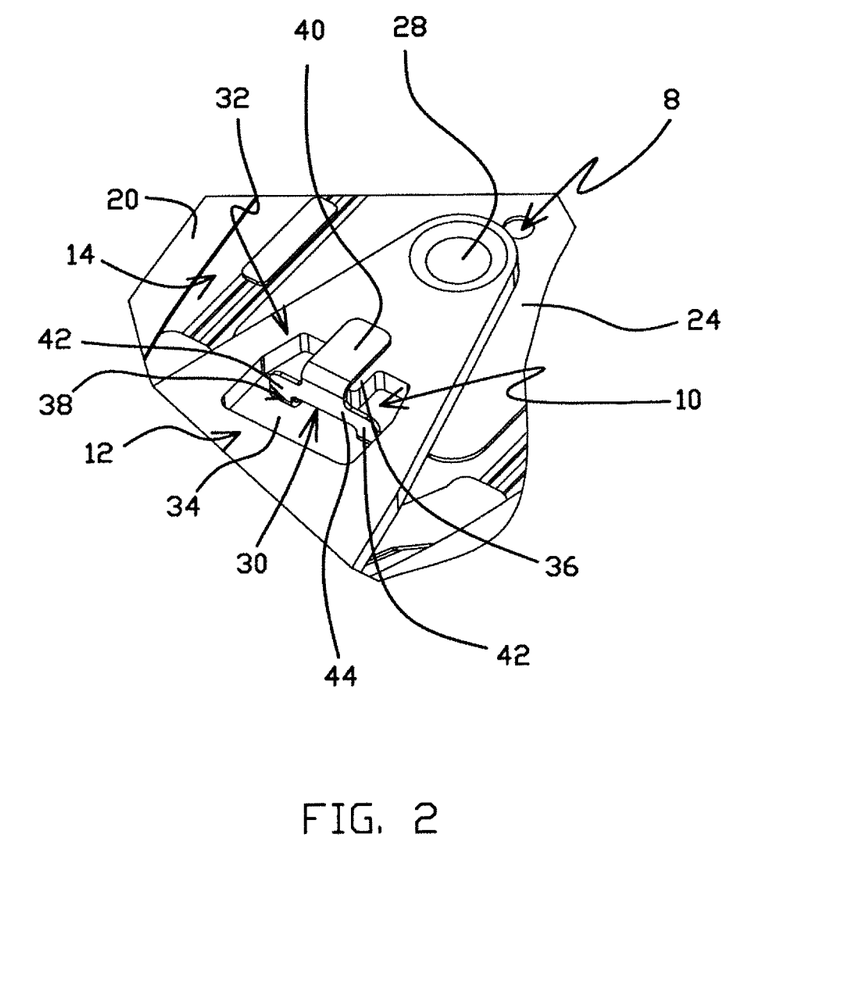
FIG. 2 is a detailed isometric illustration of the limiter shown in FIG. 1.

The distal portion of a suspension assembly 8 including a fold over limiter 10 in accordance with one embodiment of the invention is illustrated in FIGS. 1 and 2. As shown, the suspension assembly 8 includes a load beam 12 and an integrated lead or wireless flexure 14 attached to the load beam. With the exception of the limiter 10, load beam 12 and flexure 14 can be of conventional design and manufacture. In the illustrated embodiment, the flexure 14 includes a base region 16 attached to the load beam 12 and a gimbal region 18. The gimbal region 18 includes a pair of spaced-apart spring arms 20 extending from the base region 16, a cross bar 22 extending between the ends of the spring arms, and a tongue or slider mounting region 24 extending from the cross bar into a gap between the spring arms. Electrical traces 26 extend from the base region 16 of the flexure, over the gimbal region 18, and terminate at bond pads (not visible) on the slider mounting region 24 near the cross bar 22. The distal end of the load beam 12 includes a load point dimple 28 that engages the slider mounting region 24 of the flexure 14. Portions of the load beam 12 at locations further away from the gimbal region 18 than those shown in FIGS. 1 and 2 often, but need not, include stiffening rails on their edges.

Fold over limiter 10 includes an L-shaped engaging structure 30 extending from the proximal end of the slider mounting region 24 and an engagement structure 32 on the load beam 12. The engaging structure 30 cooperates with the engagement structure 32 to limit the range of movement of the slider mounting region 24 with respect to the load beam 12. In the illustrated embodiment, the engagement structure 32 includes an aperture 34 in the load beam 12 and an engaged portion 36 of the load beam adjacent to the aperture. The engaged portion 36 is a projection extending into the aperture 34 in the illustrated embodiment, although other embodiments (not shown) do not include such a projection. The engaging structure 30 includes a tab 38 extending from the slider mounting region 24 into the aperture 34, and a hook 40 extending from the tab over the engaged portion 36. In the illustrated embodiment, the tab 38 is generally centrally located on the proximal end of the slider mounting region is formed by a pair of spaced legs 42 and a bridge 44 extending between the legs. As described below, the legs 42 function as forming support regions during the manufacture of the limiter 10. The hook 40 extends from a generally central location on the bridge 44. As shown, the tab 38 and hook 40 are generally planar members in the illustrated embodiment. The width of the hook 40 is less than the width of the tab 38. The hook 40 is thereby transversely offset from at least portions of the tab 38 intersecting the slider mounting region 24. As shown, the hook 40 is sufficiently long to overlap the engaged portion 36 by a significant distance, thereby providing the limiter 10 with high engagement.

In other embodiments (not shown), the engaging structure can be on the load beam or another component extending over the gimbal region (e.g. a stiffener member), and the engagement structure on the slider mounting region. In still other embodiments, the engaging structure can be located at other locations on the slider mounting region or the gimbal region. The engagement structure can be located at other portions of the suspension assembly, and can be on the edge of the structure and include an opening rather than an aperture. The engaging structure can also take other forms (not shown). The aperture 34 can also take other forms while still providing clearance for the forming operation described below. In the illustrated embodiment of the invention the engaging structure 30 extends in a direction that is generally parallel to a longitudinal axis of the suspension assembly 8. However, in other embodiments (not shown) the engaging structure can extend in other directions (e.g., in a direction parallel to a transverse direction of the suspension assembly).

Figure 3A:
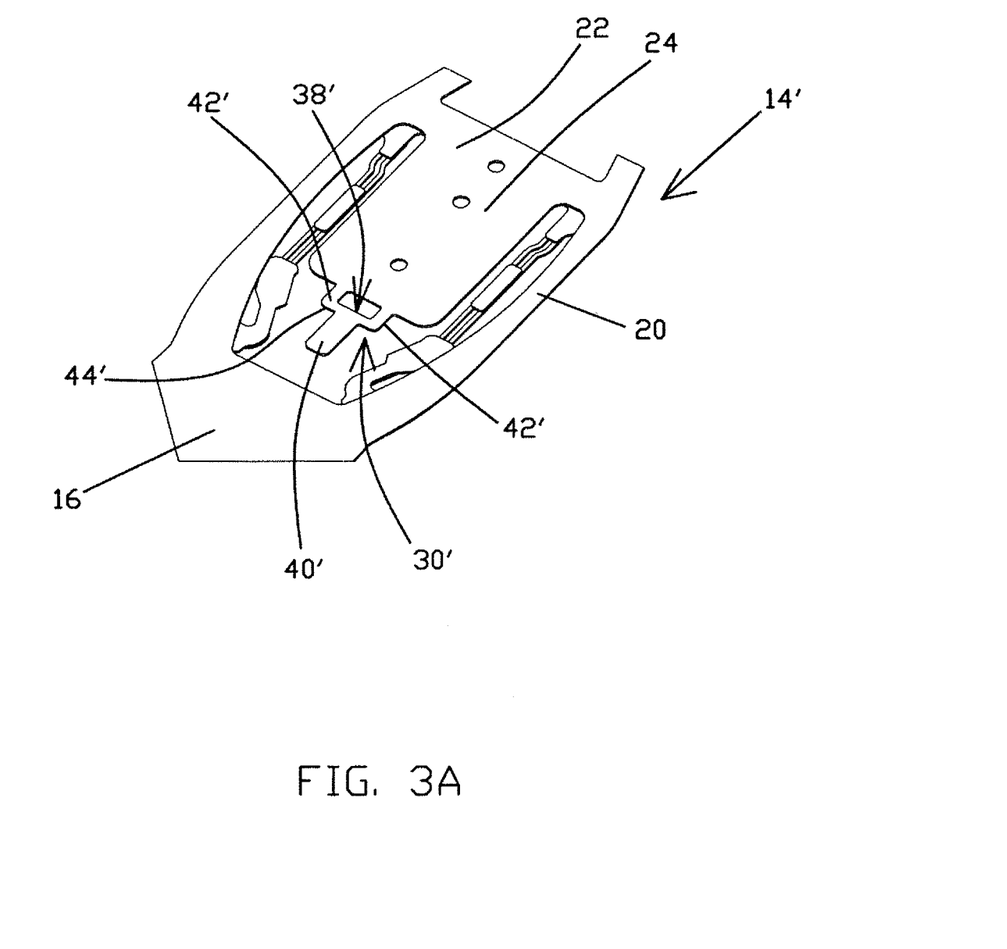
FIGS. 3A-3D are isometric illustrations showing a sequence of steps in accordance with another embodiment of the invention for manufacturing the limiter shown in FIG. 1.

A method for manufacturing a suspension assembly 8 including a fold over limiter 10 can be described with reference to FIGS. 3A-3D. FIG. 3A is an illustration of a distal end of a flexure 14' having an unformed engaging structure 30', including the unformed tab 38' and unformed hook 40', on the proximal end of the slider mounting region 24. Flexure 14' can be formed using conventional additive and/or subtractive photolithographic, deposition and etching processes. In the embodiment shown in FIG. 3A, the unformed engaging structure 30' is integral and coplanar with and formed from the same material as the slider mounting region 24.

Figure 3B:
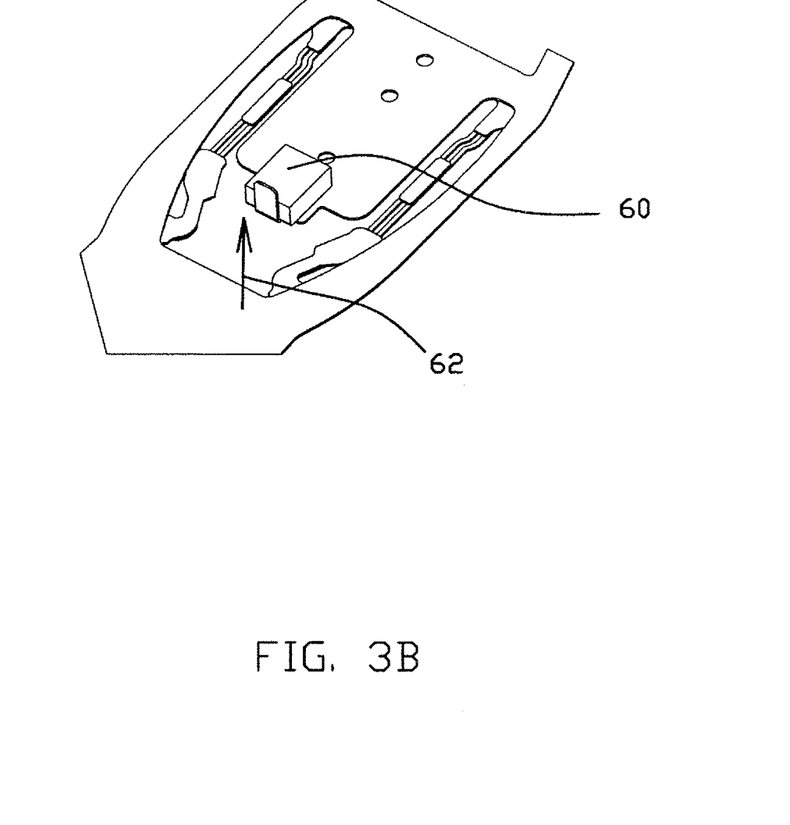

FIG. 3B shows a first forming process that is performed on the engaging structure 30'. As shown, tooling such as a first forming die 60 is positioned on the flexure 14' with a forming edge of the die located on the bend path at which it is desired to bend the hook 40' with respect to the tab 38'. In one embodiment, the forming die 60 is positioned on at least the tab 38' with the hook 40' extending beyond the forming edge of the die. Tooling such as a wiper (not shown) is then engaged with the hook 40' and driven with respect to the die 60 to form the hook with respect to the tab 38'. In one embodiment this forming operation is performed by driving the wiper in a direction 62 (known as the Z-direction) that is generally perpendicular to the planar surface of the tab 38'. The hook 40' is formed to an angle of approximately ninety degrees with respect to the tab 38' in one embodiment, although the hook can be formed to other angles with respect to the tab in other embodiments (not shown). The forming die 60 is withdrawn from the flexure 14' after the first forming operation.

Figure 3C:
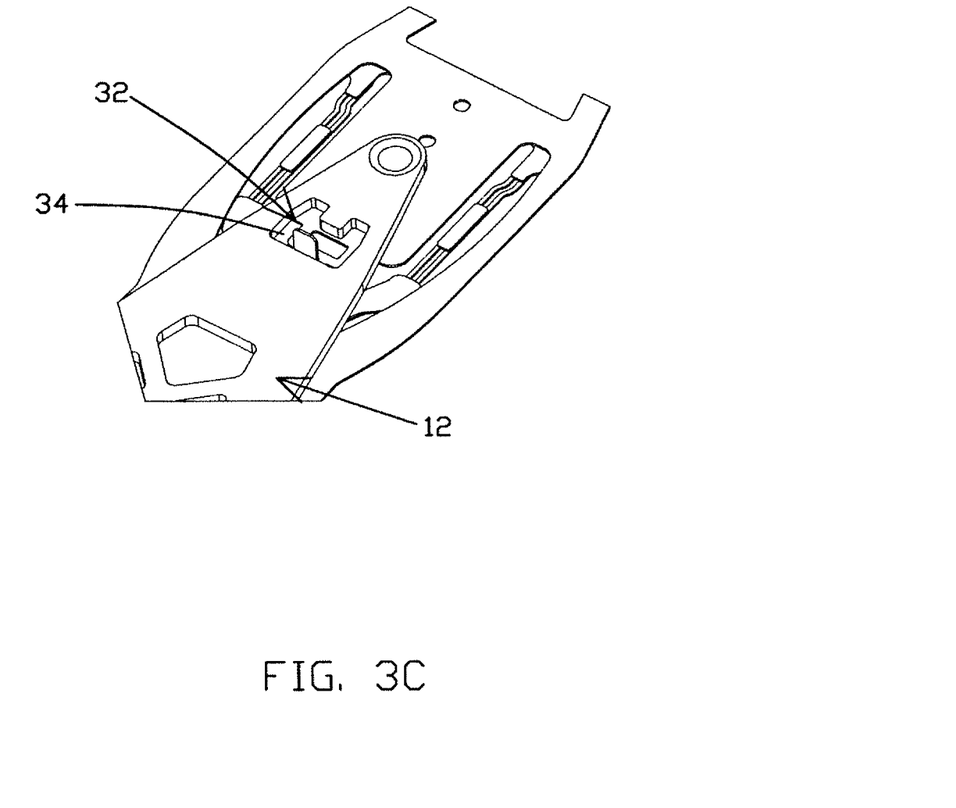

After the first forming operation the load beam 12 is positioned at the desired location with respect to the flexure 14' as shown in FIG. 3C. The formed hook 40' will extend into the aperture 34 following this component placement operation. Conventional processes such as welding (not shown) can then be used to attach the partially formed flexure 14' to the load beam 12. Conventional component manipulation processes can be used to position the flexure 14' and load beam 12 with respect to one another. Because the effective footprint of the formed hook 40' is relatively small with respect to the aperture 34, only motion in the z-direction is necessary to move the hook into the aperture.

Figure 3D:
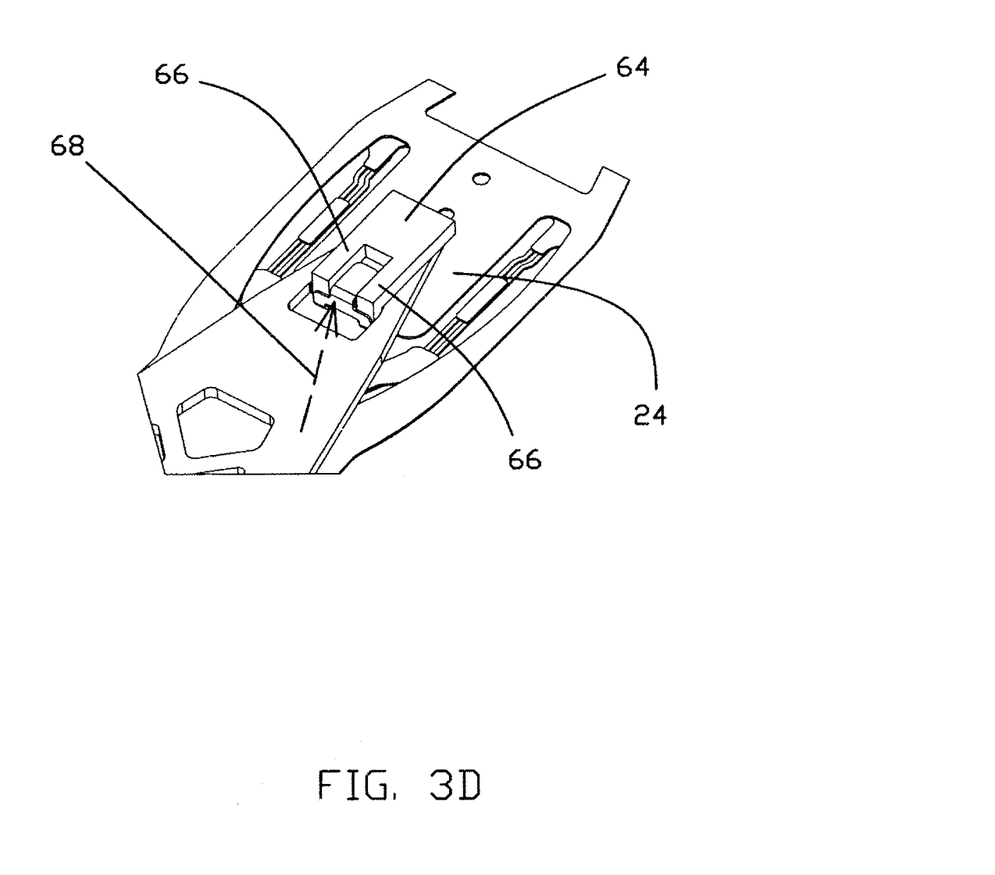

FIG. 3D shows a second forming process that is performed on the engaging structure 30'. Tooling such as a second tooling die 64 is positioned on the flexure 14' and/or load beam 12 with a forming edge of the die located on the bend path at which it is desired to bend the tab 38' with respect to the slider mounting region 24. In particular, the die 64 has a forming edge that is located along the bend path at locations that are transversely spaced from the intersection of the tab 38' and hook 40'. In the illustrated embodiment this is achieved by a die 64 having a pair of spaced-apart arms 66 that is positioned on the flexure 14' with the forming edges at the intersections of the tab legs 42' and the slider mounting region 24. The arms 66 of tooling die 64 are spaced apart by a distance that allows the hook 40' to move without interference from the tooling die during the second forming operation. Similarly the space between the arms 66 of the tooling die 64 is long enough to allow the length of the hook 40' to move without interference from the tooling die during the forming operation.

Tooling such as a wiper (not shown) is engaged with the tab 38' and driven with respect to the tooling die 64 to form the tab with respect to the slider mounting region 24. In one embodiment this forming operation is performed by driving the wiper in a direction 68 (the Z-direction) that is generally perpendicular to the planar surface of the slider mounting region 24. The tab 38' is formed to an angle of approximately ninety degrees with respect to the slider mounting region 24 in one embodiment, although the tab can be formed to other angles with respect to the slider mounting region in other embodiments (not shown). During this forming operation the hook 40' moves through the space between the arms 66 of the die 64 and over the engaged portion 36 of the load beam 12. In one embodiment of the invention, the second forming operation is performed to position the hook 40' in a generally parallel orientation with respect to the engaged portion 36 and/or the slider mounting region 24. In other embodiments (not shown) the hook 40' can be non-parallel to the slider mounting region. In general, the aperture 34 must be large enough to accommodate any portions of the wipers that extend into the aperture during the second forming operation. The second forming operation can be performed with wiper motion only in the z-direction. After the second forming operation the die 64 is withdrawn.

Other methods can also be used to manufacture suspension assemblies 8 including fold over limiter 10. For example, the distal end of a flexure having an unformed engaging structure, including an unformed tab and an unformed hook on the proximal end of a mounting region (e.g., a flexure such as 14' shown in FIG. 3A) can be welded or otherwise attached to a load beam having an engaging structure (e.g., the load beam 12 shown in FIG. 3B). After this attachment step, the first and second forming steps described above can be performed on the engaging structure (i.e., the tab 38 and the hook 40 can be formed after the flexure 14 is assembled onto the load beam 12).

Figure 4:
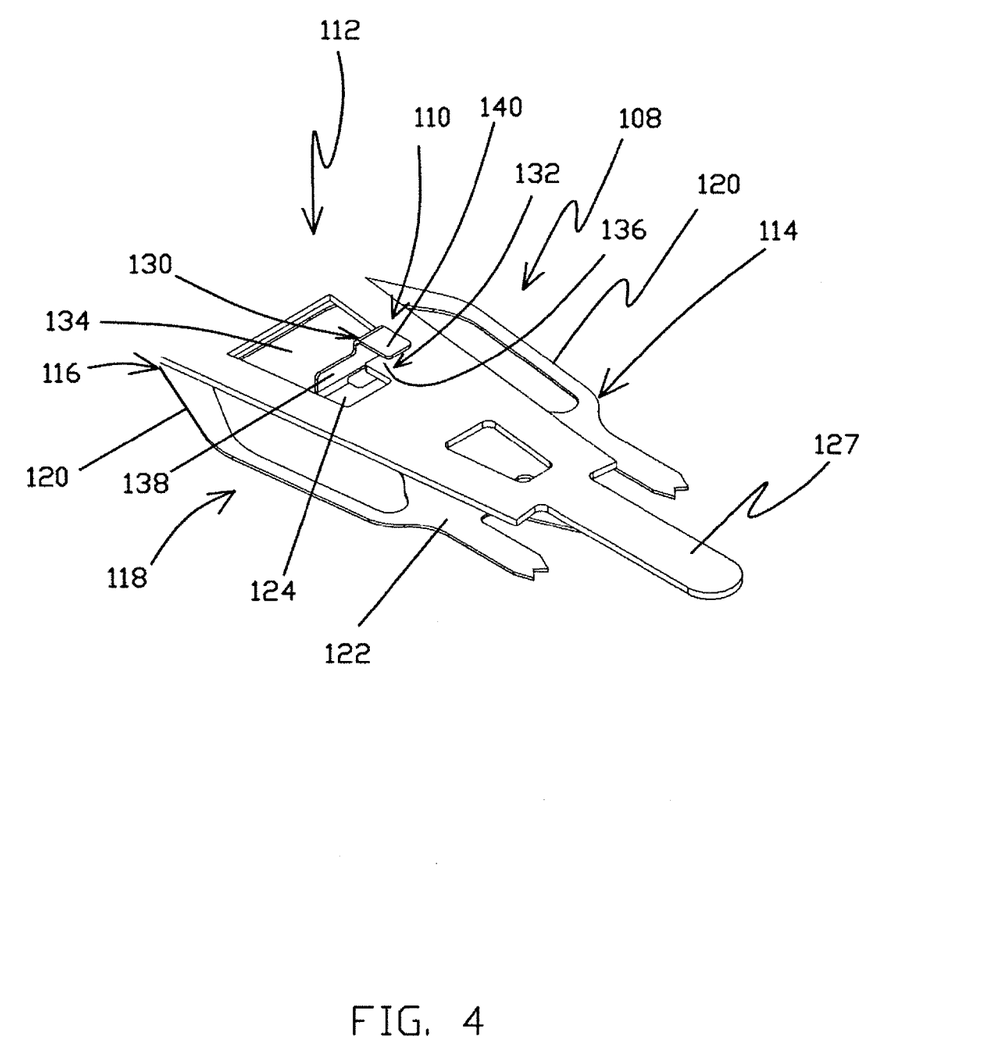
FIGS. 4 and 5 are isometric illustrations of the distal end of a suspension assembly including a fold over limiter in accordance with another embodiment of the invention.
Figure 5:
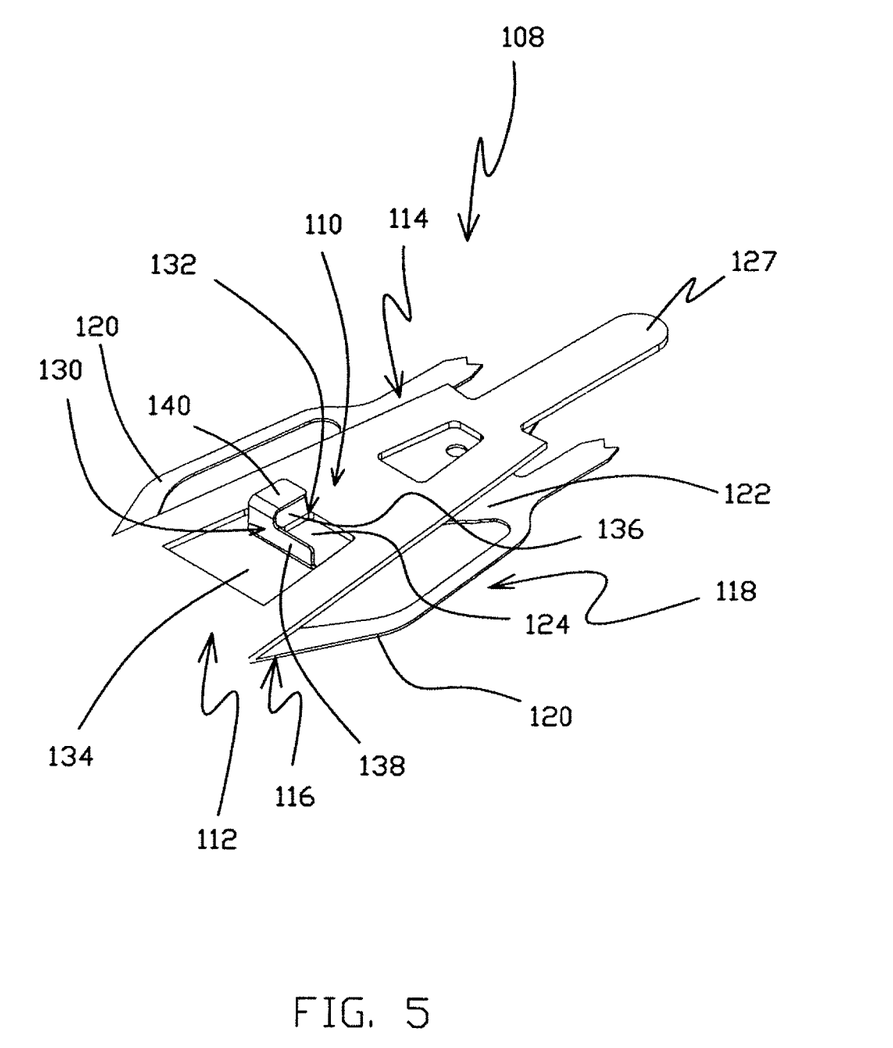

FIGS. 4 and 5 illustrate the distal portion of a suspension assembly 108 including a fold over limiter 110 in accordance with another embodiment of the invention. As shown, the suspension assembly 108 includes a load beam 112 and a flexure 114 attached to the load beam. With the exception of the limiter 110, load beam 112 and flexure 114 can be of conventional design and manufacture. In the illustrated embodiment, the flexure 114 includes a base region 116 attached to the load beam 112 and a gimbal region 118. The gimbal region 118 includes a pair of spaced-apart spring arms 120 extending from the base region 116, a cross bar 122 extending between the ends of the spring arms, and a tongue or slider mounting region 124 extending from the cross bar into a gap between the spring arms. The distal end of the load beam 112 includes a head lift tab 127. Portions of the load beam 112 at locations further away from the gimbal region 118 than those shown in FIGS. 4 and 5 often, but need not, include stiffening rails on their edges.

Fold over limiter 110 includes a generally L-shaped engaging structure 130 (as seen from its edge) extending from the proximal end of the slider mounting region 124 and an engagement structure 132 on the load beam 112. The engaging structure 130 cooperates with the engagement structure 132 to limit the range of movement of the slider mounting region 124 with respect to the load beam 112. In the illustrated embodiment, the engagement structure 132 includes an aperture 134 in the load beam 112 and an engaged portion 136 of the load beam adjacent to the aperture. The engaged portion 136 is a projection extending into one side of the aperture 134 in the illustrated embodiment, although other embodiments (not shown) do not include such a projection. The engaging structure 130 includes a tab 138 extending from the slider mounting region 124 into the aperture 134, and a hook 140 extending from the tab over the engaged portion 136. In the illustrated embodiment, the tab 138 is generally centrally located on the proximal end of the slider mounting region 124 and extends generally transversely across the end of the slider mounting region. The tab 138 functions as a forming support region during the manufacture of the limiter 110. The hook 40 extends from the side of the tab 138 adjacent to the engaged portion 136 of the load beam 112. As shown, the tab 138 and hook 140 are generally planar members in the illustrated embodiment. The width of the hook 140 is less than the width of the tab 138. The hook 140 is thereby transversely offset from at least portions of the tab 138 intersecting the slider mounting region 124. As shown, the hook 140 is sufficiently long to overlap the engaged portion 136 by a significant distance, thereby providing the limiter 110 with high engagement. As perhaps best shown in FIG. 4, in the illustrated embodiment the tab 138 is connected to the slider mounting region 124 only at a location that is transversely offset from the location at which the hook 140 is connected to the tab. Suspension assembly 108 and fold over limiter 110 can be manufactured in a manner similar to that of suspension assembly 8 and limiter 10 described above.

The invention offers a number of important advantages. The limiter is capable of providing a high degree of engagement with a low gap height. By way of example, the invention can be used to produce limiters having 270 μm engagement length and 10 μm gap heights. Other embodiments of the limiter can have greater or lesser engagements and gap heights. These features can also be efficiently achieved by merge-free processes that necessitate motion only in the z-direction.

Although the invention has been described with reference to preferred embodiments, those skilled in the art will recognize that changes can be made in form and detail without departing from the spirit and scope of the invention.

What is claimed is:

1. A method for manufacturing a disk drive head suspension having first and second components and a limiter structure for limiting motion between the first and second components, including:
   providing a first component having an engaged structure including an open region and an engaged portion adjacent to the open region;
   providing a second component having an unformed engaging structure including a hook portion and a tab portion extending from a motion-limited structure, wherein the hook portion is distal to the tab portion and the tab portion is between the hook portion and the motion-limited structure, and wherein the unformed engaging structure is coplanar with a portion of the motion-limited structure from which the unformed engaging structure extends;
   forming the hook portion with respect to the tab portion thereby changing the unformed engaging structure to an engaging structure;
   positioning the first component with respect to the second component after forming the hook portion of the engaging structure on the second component, including extending the hook portion of the engaging structure into the open region of the engaged structure; and
   forming the tab portion of the engaging structure with respect to the motion-limited structure after the first component is positioned with respect to the second component, wherein forming the tab portion after the first component is positioned with respect to the second component causes the tab portion to extend into the open region and causes the hook portion to extend over the engaged portion of the first component.

2. The method of claim 1 wherein forming the hook portion includes bending the hook portion with respect to the tab portion about a tooling die.

3. The method of claim 2 wherein bending the hook portion includes engaging the hook portion with tooling and moving the tooling in a z-direction with respect to the tab portion.

4. The method of claim 1 wherein positioning the first component with respect to the second component includes moving the first and second components in a z-direction with respect to one another.

5. The method of claim 1 wherein forming the tab portion includes bending the tab portion with respect to the motion-limited structure about a tooling die.

6. The method of claim 5 wherein bending the tab portion includes engaging the tab portion with tooling and moving the tooling in a z-direction with respect to the motion-limited structure.

7. The method of claim 6 wherein moving the tooling includes moving the tooling into the open region of the first component.

8. The method of claim 5 wherein bending the tab portion includes causing the hook to move without interference from the tooling die.

* * * * *